Aug. 20, 1929.　　　E. G. COKER　　　1,724,993

SPRING BALANCE

Filed June 9, 1927

E. G. Coker
INVENTOR

Patented Aug. 20, 1929.

1,724,993

UNITED STATES PATENT OFFICE.

ERNEST GEORGE COKER, OF CHINGFORD, ENGLAND.

SPRING BALANCE.

Application filed June 9, 1927, Serial No. 197,757, and in Great Britain June 30, 1926.

The invention relates to spring balances of the kind in which the transverse elastic deformation of a tubular member is transmitted by suitable multiplying mechanism to an indicator and consists in the improved combinations of elements hereinafter described and particularly pointed out in the claims.

Referring to the accompanying diagrammatic drawings, which illustrate one form of the invention in which the elastic member takes the form of a ring:—

Figure 1:
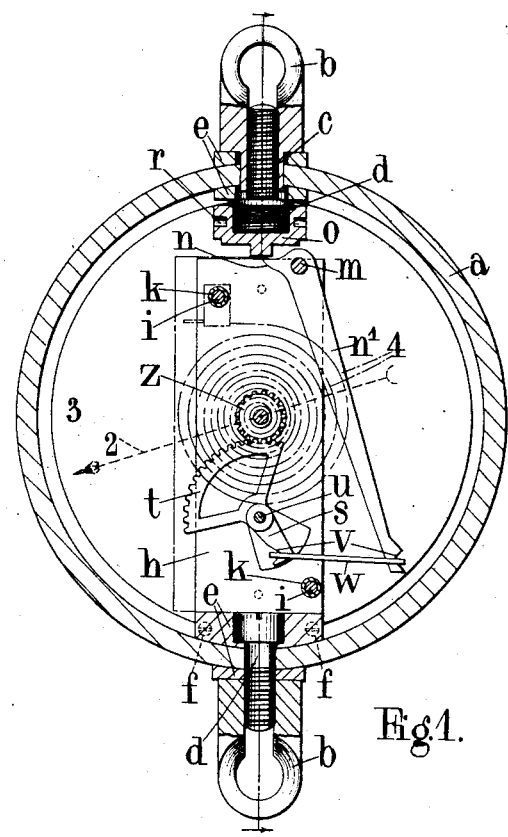

Figure 1 shows a side elevation partly in section and

Figure 2:
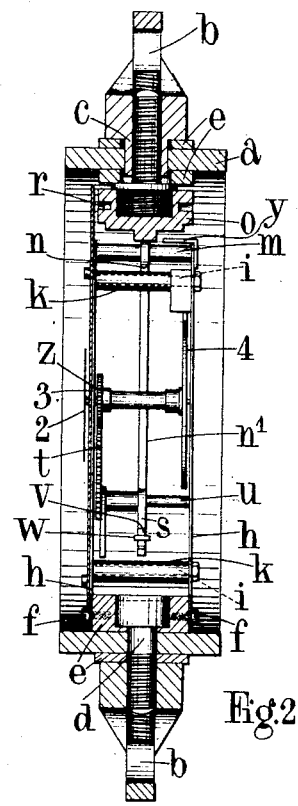

Figure 2 a corresponding end view also partly in section, while

Figure 3:
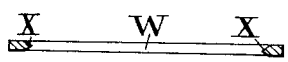
Figure 4:
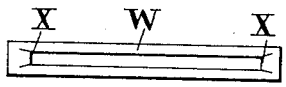

Figures 3 and 4 show sectional elevation and plan respectively of a link forming part of the multiplying gear.

In carrying the invention into effect according to the illustrative form shown in the drawings, the elastic member takes the form of a short length of tube, $a$, of uniform thickness provided with upper and lower eye bolts, $b$, $b$, or the equivalent at diametrically opposite points. Each such eye bolt may be formed integrally with an internally-threaded spigot, $c$, passing from without through a hole in the ring and secured from within by a screw pin, $d$, engaging with the spigot, suitable packing pieces, $e$, $e$, being preferably provided inside and outside the ring as shown. The tube $a$ may be of circular, oval, or other suitable shape, the load being applied in all cases transversely of said tube.

The multiplying mechanism is conveniently built up as an independent unit which lies within the ring, $a$, and between the eye bolts and is secured to one of the packing pieces, $e$, by suitable means such as the screw pins, $f$, $f$, or alternatively the unit may be secured to the ring itself in the neighbourhood of one of the eye bolts. To the upper part of the unit frame, which may be formed of two parallel plates, $h$, $h$, spaced apart and held in position by screws, $i$, $i$, and distance sleeves, $k$, $k$, a bell crank is pivoted at the point, $m$, having a short arm, $n$, and a long arm, $n'$. The free end of the short arm, $n$, is disposed in the main diameter of the instrument and bears, it may be by way of a friction-reducing device, against an internally-screwed member, $o$, which may conveniently be adjustable by help of a series of tommy holes, $r$, $r$, on the correspondingly threaded head of the screw pin, $d$, above mentioned. The long arm of the bell crank, $n'$, is connected to the arm, $s$, of a toothed sector, $t$, pivoted at $u$, the two arms, $n'$ and $s$, being provided with notches, $v$, $v$, as shown on the sides remote from each other and connected by a link, $w$, which may conveniently take the form of a thin oblong plate the centre part of which is removed and the inside of the short ends formed into knife edges, $x$, $x$, (see Figures 3 and 4) to engage with the notches, $v$, $v$, above mentioned.

Finally, the toothed sector, $t$, meshes with a pinion, $z$, of small diameter carrying a pointer, 2, co-axial with the ring and movable over a graduated dial, 3, conveniently attached to one of the plates, $h$, $h$.

A spiral spring, 4, is provided after the nature of the hair-spring of a watch for returning the multiplying mechanism when deflected or for causing it to follow up deflections of the ring.

In order to prevent the sector, $t$, disengaging with the pinion, $z$, one of the distance sleeves, $k$, may be arranged as shown so as to form a stop against which the long arm, $n'$, of the bell-crank butts after the ring has deflected a certain amount. Also a stop $y$ is provided on one of the parallel plates $h$ against which the member $o$ makes contact on the ring deflecting in the other direction.

Although for convenience, the terms "upper" and "lower" have been used in the above description, it will be evident that the instrument can be used in any position.

The elastic member, though preferably formed of circular section, may be elliptical, oval or other suitable shape, while modifications may be made in the details of the multiplying mechanism described above without exceeding the scope of the invention.

Having now described my invention, what I claim as new and desire to secure by Letters Patent is:—

1. A spring balance comprising in combination a deformable elastic tubular member to which the load is applied transversely, said tubular member carrying an inwardly-projecting bracket member rigidly attached to said tubular member at a certain point and an abutment member at an opposite point, and means for multiplying the deformations of said tubular member under stress, said multiplying means comprising a bell crank operatively disposed within said tubular member, and pivoted on said bracket member and having an arm operatively disposed in relation to said abutment member, an associated indicator and gear element together with a second gear element for actuating said first-mentioned gear element and means for connecting said bell crank to said second-mentioned gear element.

2. A spring balance as claimed in claim 1, in which the bell crank has a long arm and a short arm, a spring acting to cause the short arm of said bell crank to follow movements of said abutment member.

3. A spring balance as claimed in claim 1, in which the bell crank has a long arm and a short arm, and one of said gear elements takes the form of a toothed sector together with a stop co-acting with the long arm of said bell crank to prevent said toothed sector disengaging.

In testimony whereof I have signed my name to this specification.

ERNEST GEORGE COKER.